(12) United States Patent
Clodfelter (10) Patent No.: US 7,683,821 B1
(45) Date of Patent: Mar. 23, 2010

(54) SENSOR SWEEPER FOR DETECTING SURFACE AND SUBSURFACE OBJECTS

(75) Inventor: James F. Clodfelter, Sterling, VA (US)

(73) Assignee: Niitek, Inc., Sterling, VA (US)

( * ) Notice: Subject to any disclaimer, the term of this patent is extended or adjusted under 35 U.S.C. 154(b) by 135 days.

(21) Appl. No.: 11/977,582

(22) Filed: Oct. 25, 2007

Related U.S. Application Data (60) Provisional application No. 60/854,395, filed on Oct. 25, 2006, provisional application No. 60/967,558, filed on Sep. 5, 2007.

(51) Int. Cl.
*G01S 13/04* (2006.01)
(52) U.S. Cl. .......................... 342/22; 342/27
(58) Field of Classification Search .................. 342/22, 342/27
See application file for complete search history.

(56) References Cited

U.S. PATENT DOCUMENTS

| | | | |
|---|---|---|---|
| 2,205,073 A | 6/1940 | Smit | |
| 2,303,744 A | 12/1942 | Jacobs | |
| 2,627,676 A | 2/1953 | Hack | |
| 2,720,714 A | 10/1955 | Flynn et al. | |
| 2,990,026 A | 6/1961 | Albee | |
| 3,061,951 A | 11/1962 | Barron | |
| 3,243,898 A | 4/1966 | Lewis, Jr. et al. | |
| 3,318,024 A | 5/1967 | Fujinaka et al. | |
| 3,516,181 A | 6/1970 | Jordan | |
| 3,626,804 A | 12/1971 | Paramythioti | |
| 3,733,721 A | 5/1973 | Clemens | |
| 3,771,413 A | 11/1973 | Sieg et al. | |
| 4,089,565 A | 5/1978 | Loegering et al. | |
| 4,098,011 A | 7/1978 | Bowerman et al. | |
| 4,135,188 A | 1/1979 | Bickley, Jr. et al. | |
| 4,194,310 A | 3/1980 | Bowerman | |
| 4,234,941 A | 11/1980 | Welland, Jr. et al. | |
| 4,249,588 A | 2/1981 | Egan | |
| 4,378,643 A | 4/1983 | Johnson | |
| 4,489,405 A | 12/1984 | Tendler | |
| 4,525,941 A | 7/1985 | Ruth, Jr. | |
| 4,565,412 A | 1/1986 | Comminge et al. | |
| 4,590,123 A | 5/1986 | Hashimoto et al. | |
| 4,611,411 A | 9/1986 | Ringler et al. | |

(Continued)

FOREIGN PATENT DOCUMENTS

CA      2 234 597      10/1999

(Continued)

OTHER PUBLICATIONS

English language abstract of DE 38 41 303, published Jun. 13, 1990.

(Continued)

*Primary Examiner*—John B Sotomayor
(74) *Attorney, Agent, or Firm*—DLA Piper LLP (US)

(57) ABSTRACT

An apparatus and method for detecting surface and subsurface objects is provided. A sweeping mechanism comprising a sensor is connected to a mounting frame. The mounting frame is connected to a motorized host platform. The sweeping mechanism sweeps the sensor according to a predetermined footprint when the motorized host platform either pulls or pushes the mounting frame. A signaling mechanism connected to the sensor produces a signal when the sensor senses an object beneath the surface.

24 Claims, 5 Drawing Sheets

U.S. PATENT DOCUMENTS

| | | | |
|---|---|---|---|
| 4,616,350 A | 10/1986 | Tendler | |
| 4,621,348 A | 11/1986 | Tendler | |
| 4,672,590 A | 6/1987 | Tendler | |
| 4,676,009 A | 6/1987 | Davis et al. | |
| 4,723,585 A | 2/1988 | Mechtel | |
| 4,773,298 A | 9/1988 | Tischer et al. | |
| 4,870,687 A | 9/1989 | DeLeon | |
| 4,909,128 A | 3/1990 | Grinwald | |
| 4,972,379 A | 11/1990 | Harris, Jr. | |
| 5,002,109 A | 3/1991 | Shepler et al. | |
| 5,007,325 A | 4/1991 | MacWatt | |
| D319,138 S | 8/1991 | Hart | |
| 5,176,765 A | 1/1993 | Yamaguchi et al. | |
| 5,189,243 A | 2/1993 | Hambric | |
| 5,198,608 A | 3/1993 | Cahill et al. | |
| 5,301,441 A | 4/1994 | Kownacki | |
| 5,327,139 A * | 7/1994 | Johnson | 342/22 |
| 5,351,734 A | 10/1994 | Mouri et al. | |
| 5,420,589 A * | 5/1995 | Wells et al. | 342/22 |
| 5,592,170 A * | 1/1997 | Price et al. | 342/22 |
| 5,663,520 A | 9/1997 | Ladika et al. | |
| 5,786,542 A | 7/1998 | Petrovich et al. | |
| 5,892,360 A | 4/1999 | Willer et al. | |
| 5,896,680 A | 4/1999 | Kim et al. | |
| 5,900,833 A * | 5/1999 | Sunlin et al. | 342/22 |
| 5,926,977 A | 7/1999 | Sanders | |
| 5,930,200 A | 7/1999 | Kabel | |
| 5,979,289 A | 11/1999 | French | |
| 5,979,290 A | 11/1999 | Simeone | |
| 5,988,037 A | 11/1999 | Haughom et al. | |
| 5,992,056 A | 11/1999 | Lohrmann | |
| 6,006,646 A | 12/1999 | Makris et al. | |
| 6,029,558 A | 2/2000 | Stevens et al. | |
| 6,082,024 A | 7/2000 | Del Biondi | |
| 6,094,157 A * | 7/2000 | Cowdrick | 342/22 |
| 6,115,945 A | 9/2000 | Ellis, III | |
| 6,128,999 A | 10/2000 | Sepp et al. | |
| 6,212,799 B1 | 4/2001 | Gingerich et al. | |
| 6,279,631 B1 | 8/2001 | Tuggle | |
| 6,297,449 B1 | 10/2001 | Dagtekin | |
| 6,396,433 B1 | 5/2002 | Clodfelter | |
| 6,445,334 B1 | 9/2002 | Bradley et al. | |
| 6,478,387 B1 | 11/2002 | Rayman | |
| 6,505,421 B1 | 1/2003 | Vaz | |
| 6,655,051 B1 | 12/2003 | Peche et al. | |
| 6,657,577 B1 * | 12/2003 | Gregersen et al. | 342/22 |
| 6,666,124 B2 | 12/2003 | Fleming | |
| 6,690,316 B2 * | 2/2004 | Yankielun | 342/22 |
| 6,725,572 B1 | 4/2004 | Krstic | |
| 6,751,892 B2 | 6/2004 | Chavet et al. | |
| 6,915,728 B2 | 7/2005 | Renwick et al. | |
| 6,952,990 B1 | 10/2005 | Clodfelter | |
| 7,042,385 B1 * | 5/2006 | Wichmann | 342/22 |
| 7,190,302 B2 * | 3/2007 | Biggs | 342/22 |
| 7,479,918 B2 * | 1/2009 | Johnson et al. | 342/22 |
| 7,511,654 B1 * | 3/2009 | Goldman et al. | 342/22 |
| 2002/0027521 A1 | 3/2002 | Clodfelter | 342/22 |
| 2002/0175849 A1 * | 11/2002 | Arndt et al. | 342/22 |
| 2003/0172554 A1 | 9/2003 | Chavet et al. | |
| 2003/0193429 A1 * | 10/2003 | Campana et al. | 342/22 |
| 2004/0251698 A1 | 12/2004 | Welch et al. | |
| 2005/0062639 A1 * | 3/2005 | Biggs | 342/22 |
| 2005/0128125 A1 * | 6/2005 | Li et al. | 342/22 |
| 2006/0050929 A1 * | 3/2006 | Rast et al. | 382/103 |
| 2006/0056584 A1 | 3/2006 | Allman et al. | |
| 2006/0225900 A1 | 10/2006 | Kimball | |
| 2007/0260378 A1 * | 11/2007 | Clodfelter | 701/48 |

FOREIGN PATENT DOCUMENTS

| | | |
|---|---|---|
| DE | 38 41 303 | 6/1990 |
| JP | 6-74695 | 3/1994 |
| WO | WO 02/03007 | 1/2002 |

OTHER PUBLICATIONS

English language abstract of JP 6-74695, published Mar. 18, 1994.

Machine English language translation of JP 6-74695, published Mar. 18, 1994.

International Search Report issued in International Application No. PCT/US2008/71846, mailed Oct. 22, 2008.

Written Opinion issued in International Application No. PCT/US2008/71846, mailed Oct. 22, 2008.

* cited by examiner

SENSOR SWEEPER FOR DETECTING SURFACE AND SUBSURFACE OBJECTS

CROSS REFERENCE TO RELATED APPLICATIONS

The present application claims the benefit of U.S. Provisional Application Ser. No. 60/854,395, filed Oct. 25, 2006 and U.S. Provisional Application Ser. No. 60/967,558, filed Sep. 5, 2007, both of which are herein incorporated by reference in their entireties.

BACKGROUND

Systems for detecting surface and subsurface objects have been used to detect concealed objects including, without limitation, hidden bombs, narcotics, cables, pipes, and corpses. Such systems also have been used to facilitate subsurface detection in various technology areas, such as for motion detection, seeing-through walls, archeology, and geology. Most notably, however, such systems are used to detect land mines. While systems for detecting surface or subsurface objects, including the invention described herein, may be advantageously employed in various applications, the invention is described herein, in terms of a system for the detection of land mines or other improvised explosive devices (IEDs), with no intent of limitation.

Since 1975, land-mines have exploded under more than 1 million people and are currently thought to be killing approximately 800 people a month. In 64 countries around the world, there are an estimated 10 million land-mines still lodged in the ground. They remain active for decades-years after wars have ended. As such, a large worldwide community has devoted extensive resources to ridding the world of both future and currently placed land mines. Mine detecting technology has been invaluable to this endeavor and has been responsible for preventing the loss of many lives.

There are currently at least four types of mine detection machines available: 1) vehicle mounted; 2) handheld; 3) airborne; and 4) mechanical clearing devices such as rollers, plows, or flails. These mine detection machines detect surface and subsurface anti-vehicular ("AT") and anti-personnel ("AP") mines. An AT mine is a type of land mine designed to damage or destroy vehicles, whereas an AP mine is used against humans.

Vehicle mounted, airborne, and mechanical clearing types of mine detection systems have value because they cover large areas and because they can have good ballistic protection or good standoff if, for example, they are remotely controlled. On the other hand, they are very expensive, very large, very heavy, and much less prevalent than handheld detection systems. In addition, mechanical clearing devices are not highly effective in detecting and clearing landmines and they tend do damage fragile ecosystems when deployed as they must destructively interact with the area they are clearing.

Handheld mine detection systems are helpful because they are inexpensive, relatively easy to use with appropriate training, easy to transport, and they are already very prevalent in the military and commercial world. However, current handheld mine detection systems require the soldier or de-miner to personally hold and sweep the sensor from side to side while walking through a hazardous environment. Thus, the soldier or de-miner risks his or her life being in such close proximity to buried explosive devices (landmines or other improvised explosive devices (IED)) which can detonate when stepped upon. Moreover, enemy fire may be directed toward the soldier engaged in de-mining. In addition, these handheld sensors must be swept at the appropriate speed and at the appropriate overlap to ensure adequate coverage so that no mines are missed by the sensor and operator. This sweep speed and overlap is an activity that requires training and experience to be proficient, let alone expedient. Mistakes can be fatal, both immediately to the operator of the sensor should he detonate a mine or later to the civilian population that will be using the recovered land should a mine have been missed.

As such, there remains a need for an improved system for employing handheld sensors to detect surface or subsurface objects that is safe, convenient, and inexpensive.

SUMMARY

The present invention is directed to an object detection system that satisfies the need for safely, conveniently, and inexpensively using handheld sensing devices for detecting surface or subsurface objects. In accordance with an exemplary embodiment of the present invention, an apparatus for detecting surface or subsurface objects is provided that comprises: a sensor, a mounting frame, a sweeping mechanism, a signaling mechanism, and a motorized host platform. The sweeping mechanism is connected to the mounting frame and the motorized host platform. The sweeping mechanism sweeps the sensor according to a predetermined footprint when the motorized host platform either pulls or pushes the mounting frame. When the sensor senses an object beneath the surface, the signaling mechanism produces a signal.

In another embodiment of the present invention, the sweeping mechanism comprises: a cradle for holding the sensor; a foam bed on the cradle for holding the sensor and for dampening vibrations; and a slant adjustment for adjusting the slant of the sensor. The slant adjustment comprises a mounting plate which comprises an upper and lower portion wherein the upper portion is connected to and supports the cradle and the bottom portion further comprises a pivot and an adjusting arc with an arctuate slot. The sweeping mechanism also comprises a riser yolk connected to the slant adjustment. The riser yolk comprises a set of upper holes and a set of lower holes, wherein the upper holes are connected to the pivot by a pin and wherein the lower holes are connected to the arctuate slot by an adjusting bolt. Also part of the sweeping mechanism is an oscillator plate connected to the riser yolk, where the oscillator plate comprises an oscillator slot and a plurality of swing adjustment holes that define the footprint of the sensor. A riser arm comprising a proximal and distal end is connected to the oscillator plate by extending into one of the plurality of swing adjustment holes. Furthermore, an oscillator platter comprises a pin which extends through the oscillator slot. A vertical axle is connected to the distal end of the riser arm and has fixed upon it the oscillator platter. The sweeping mechanism further comprises a horizontal cog gear upon which is fixed a lower end of the vertical axle. A vertical cog gear is connected to the horizontal cog gear such that the vertical cog gear rotates the horizontal cog gear, thereby oscillating the oscillator platter which in turn oscillates the cradle and therefore the sensor to sweep according to the predetermined footprint. In an alternate embodiment of the present invention, the sensor sweeper can be disassembled or folded to fit in a carrying case.

In an exemplary embodiment of the present invention, the signaling mechanism comprises a speaker electronically connected to the sensor. A processor electronically connected to the sensor and the speaker is configured to control the speaker to make a noise when the sensor detects an object. A power unit is electronically connected to the sensor, the speaker, and the processor for providing power thereto. In yet another embodiment of the present invention, the signaling mechanism comprises a light electronically connected to the sensor. A processor electronically connected to the sensor and the light is configured to control the light to emit electromagnetic waves when the sensor detects an object. A power unit is electronically connected to the sensor, the light, and the processor for providing power thereto. In an alternate embodiment of the present invention, the signaling mechanism comprises both the speaker and the light. In another embodiment of the present invention, the power unit comprises a solar panel.

In an additional embodiment of the present invention the object detection system further comprises a marking system connected to the sweeping mechanism for marking a surface of the medium that is being explored. A processor electronically connected to the sensor and the marking system is configured to control the marking system to mark a surface of a medium where an object is detected by the sensor. In a further embodiment of the present invention, the object detection system further comprises an adjustable caster wheel connected to a portion of the sensor for supporting the sensor and for adjusting the distance of the sensor from the medium being explored. In yet an another embodiment of the present invention, the object detection system comprises a processor configured to provide down-track accuracy. In an alternate embodiment, the apparatus of the present invention comprises a camera mounted either on the motorized host platform or on the mounting frame for capturing images of the signaling mechanism or to capture images of an area being explored by the sensor.

In an exemplary embodiment of the present invention, a method for detecting objects beneath a surface of a medium is provided, the method comprising the steps of: providing a sensor for detecting an object on or beneath a surface of medium; providing a sweeping mechanism for sweeping the sensor according to a predetermined footprint; operating the sweeping mechanism by pulling or pushing the sweeping mechanism; and providing a signaling mechanism for signaling when the sensor senses an object beneath the surface. In one embodiment of the present invention, the step of providing a signaling mechanism comprises providing a speaker electrically connected to the sensor and producing an audible noise from the speaker upon detection of an object by the sensor. In an alternate embodiment of the present invention, the step of providing a signaling mechanism comprises providing a light electrically connected to the sensor and producing electromagnetic waves from the light upon detection of an object by the sensor. In yet a further embodiment of the present invention, the signaling mechanism comprises both providing a speaker and a light.

In yet a further embodiment of the present invention, the inventive method further comprises: providing a marking system coupled to the sweeping mechanism; moving the sweeping mechanism in relation to an object; and marking the surface of the medium on or beneath which is located the object. In another embodiment of the present invention, the inventive method further comprises modifying the sweep footprint by replacing or altering parts of the sweeping mechanism.

In another exemplary embodiment of the present invention, a method is provided for detecting objects beneath a surface of a medium, the method comprising: sweeping a sensor over the surface of the medium according to a predetermined footprint by pulling or pushing the sensor; detecting an object on or beneath the surface of the medium with the sensor; signaling when the sensor senses an object beneath the surface by either producing an audible noise or electromagnetic waves.

These and other features, aspects, and advantages of the present invention will become better understood with reference to the following description and appended claims.

DESCRIPTION

With reference to the figures, exemplary embodiments of the invention are now described. These embodiments illustrate principles of the invention and should not be construed as limiting the scope of the invention.

Figure 1:
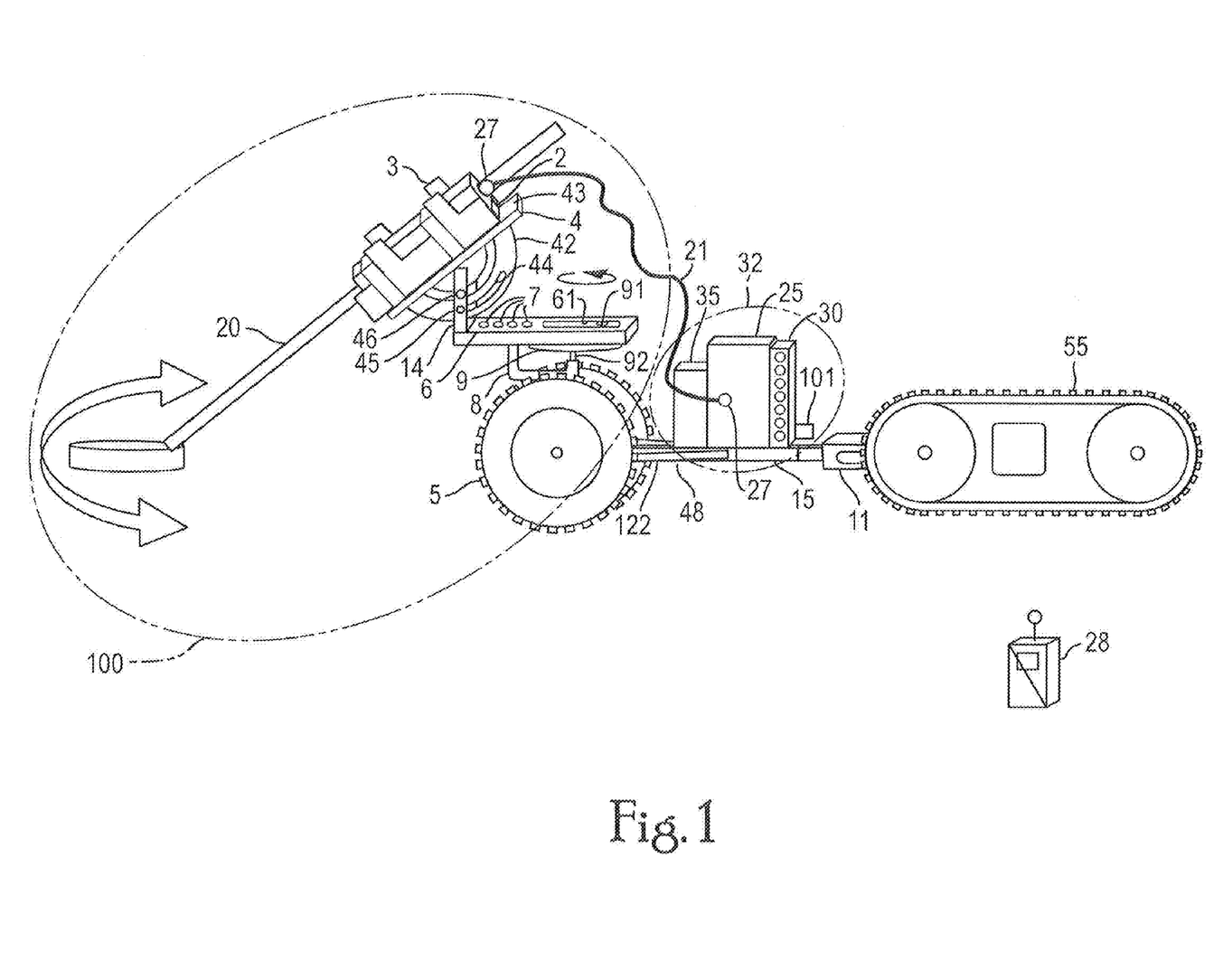
FIG. 1 is a side elevation view of a sensing device attached to a motorized host platform in accordance with an exemplary embodiment of the present invention.

FIG. 1 shows a side elevation view of an object detection system attached to a motorized host platform 55 in accordance with an exemplary embodiment of the present invention. The shown object detection system comprises a sensor sweeper 100 and a remote kit 32. Sensor sweeper 100 generally comprises a cart with gears that sweeps the sensor 20 back and forth based on a predetermined footprint very similar to the way a soldier would sweep a hand held sensor. A motorized host platform 55 pulls or pushes the self-contained sensor sweeper 100 and remote kit 32, causing the sensor sweeper 100 to sweep appropriately based on a predetermined footprint. Remote kit 32 generally comprises an interface that either boosts, creates, and/or transmits a warning signal when a sought object, such as a mine, is detected. The remote kit 32 indicates when a mine has been located generally by providing a sound or light signal, but any other notification method is contemplated by the present invention. The invention thereby advantageously provides a novel object detection system and method for safely, conveniently, and inexpensively detecting surface or subsurface objects. Each of these components are now described in more detail below.

Figure 2:
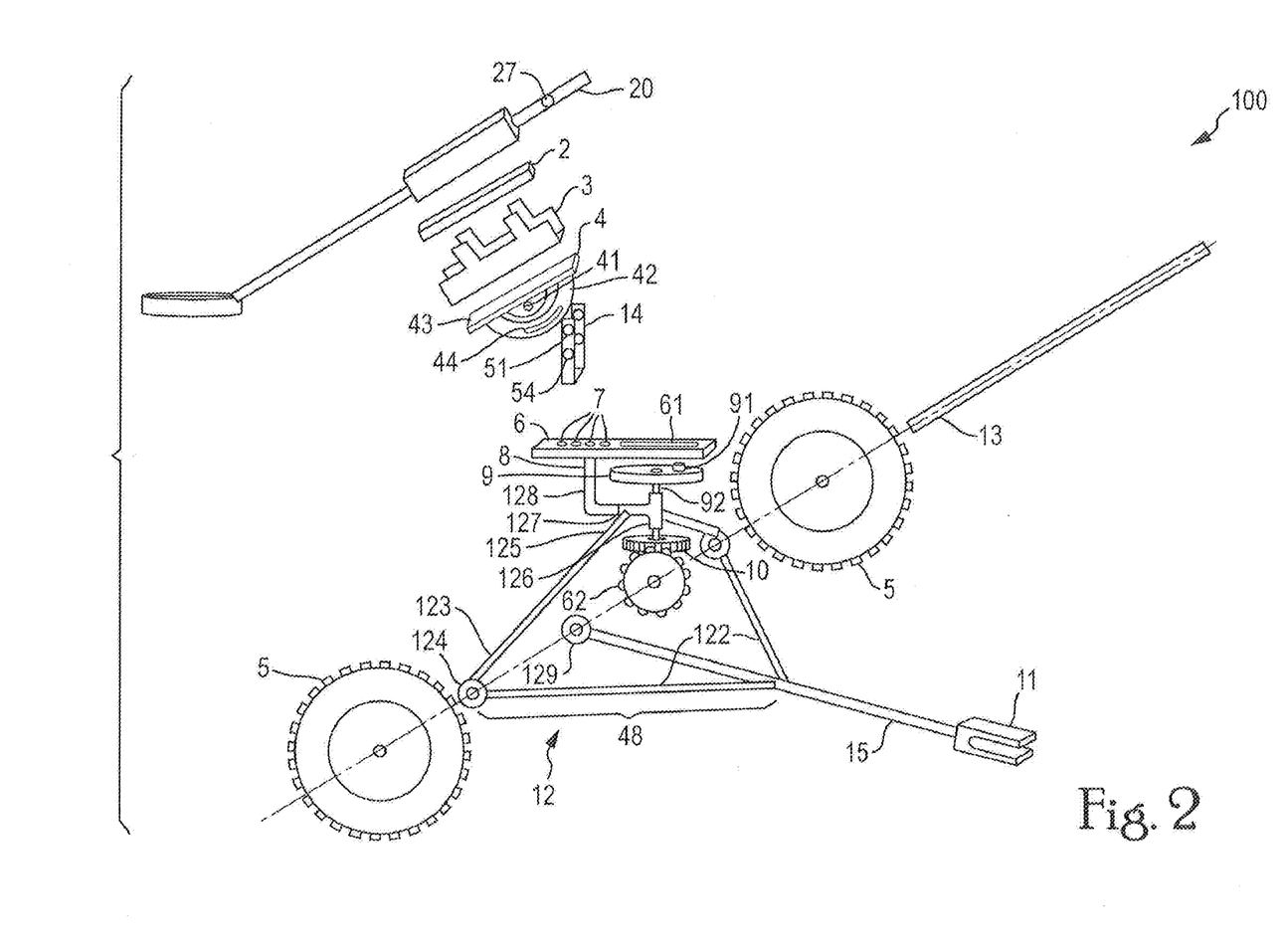
FIG. 2 is an exploded view of elements of a sensor sweeper in accordance with an exemplary embodiment of the present invention.

Referring to FIGS. 1 and 2, the elements of a sensor sweeper 100 in accordance with an exemplary embodiment of the present invention are discussed. FIG. 1 is a side elevation view of a sensor sweeper 100 attached to a motorized host platform 55 in accordance with an exemplary embodiment of the present invention. FIG. 2 is an exploded view of elements of the sensor sweeper 100 in accordance with an exemplary embodiment of the present invention. A sensor 20 such as a conventional hand-held mine sweeper is mounted within a foam bed 2 in a cradle 3. A slant adjustment 4 connected to the cradle has a pivot 41 and an adjusting arc 42 connected to a new cradle mounting plate 43. An arcuate slot 44 receives an adjusting bolt 45. A pin 46 connects the cradle pivot 41 to holes 51 in riser yolk 14. Adjusting bolt 45 extends through riser holes 54 and arcuate slot 44. Riser yolk 14 is mounted on the end of oscillator slot plate 6. A selected one of a group of swing adjustment holes 7 pivot on the extended top of riser arm 8. A different hole 7 is selected for a different swing footprint as would be well understood by one of ordinary skill in the art. Oscillator slot 61 receives pin 91 on oscillator platter 9, which is fixed on vertical axle 92. The bottom end of vertical axle 92 is fixed to horizontal cog gear 10. Vertical cog gear 62 rotates horizontal cog gear 10 and oscillates plate 6 and attached cradle 3 and sensor 20. In an alternate embodiment of the present invention, sensor sweeper 100 comprises interchangeable adapter cradles to accommodate connecting various handheld sensors of varying shapes and sizes. In yet a further embodiment of the present invention, sensor sweeper 100 comprises interchangeable or reconfigurable gears, levers and other parts to modify the sensor sweep rate per linear distance traveled, as appropriate sweep rates are required to accommodate various effective footprints for sensors and to prevent un-swept areas. In an additional embodiment, the sensor sweeper 100 folds or disassembles to easily fit in a carrying case.

In one embodiment of the present invention, the sensor 20 is for detecting a surface or subsurface object and has a headphone or speaker output 27. Examples of such sensors 20 include but are not limited to those described in U.S. Pat. No. 7,042,385 and U.S. Pat. No. 6,396,433, both issued to applicant, the disclosures of which are incorporated herein by reference, Ground Penetrating Radars ("GPRs"), metal detectors, seismic detectors, acoustic detectors, quadrupole resonance images, magnetometers, and any and all other sensor types. The objects that can be detected include but are not limited to landmines, hidden bombs, narcotics, cables, pipes, rebar, corpses, money, metal, geological structures, archeological structures, motion, and any other such detectable object. The sensor 20 can be releasably mounted on the foam bed 2 by any and all understood releasably connecting methods including but not limited to permanent and semi-permanent mechanisms such as velcro straps, rubber straps, clamps, quick-release clamps, spring clamps, threaded nuts and bolts. In an alternate embodiment, foam bed 2 provides a vibrational dampener for sensor 20. In yet a further embodiment, a caster wheel assembly is attached to the sensor to provide improved height control of the sensor head above the ground.

In one exemplary embodiment of the present invention, sensor sweeper 100 is coupled to mounting frame 12. Mounting frame 12 has a connector 15 which can be a tow or push bar with connected arms 122. Outer ends of side arms 122 and lower ends of sloping upper support arms 123 are connected to axle bearings 124. Upper ends 125 of support arms 123 are connected to a tee 126 which has a connection 127 for riser arm 8 and a vertical bearing housing 128 for vertical axle 92. Main axle 13 extends through axle bearings 124 and central bearing 129. Vertical cog wheel 62 is fixed to axle 13 to rotate with the axle 13 and wheels 5. The other end 11 of the connector on an end of the connector 15 connects the new system to a motorized host platform 55. Though not required, the mounting frame 12 is preferably made of a material that will not be detected by the sensor 20 or that will minimize interference with the particular sensor technology being applied. For example, if the sensor 20 detects metal, then the mounting frame 12 will preferably not be made out of metal but instead be made of out of rubber, plastic, wood, stone, fabric, and any other such material. In an alternate embodiment mounting frame 12 can be any platform or base capable of attachment to at least one wheel and capable of dynamically supporting an object and of rotating vertical cog wheel 62. The mounting frame 12 can be but is not limited to a rod, a set of rods, a plank, a box, a crate, a basket, and any other platform, all of which are contemplated by the present invention.

The connector 15 is any device that can connect the mounting frame 12 to a second platform. Examples of such a connector 15 include but are not limited to a trailer tongue, a rope, a chain, a rod, a stick and the like. The first end 48 of the connector 15 is connected to a side of the mounting frame 12 by any known conventional connecting method including permanent and semi-permanent connection methods such as soldering, bolting, or gluing and similar such methods; and non-permanent connection methods such as by clasp, latch, tying, and other such connection methods. Connector 15 can also fold into mounting frame 12. Such folding into mounting frame 12 can be accomplished by attaching the connector 15 to mounting frame 12 using a hinge or such similar folding mechanism as may be understood by those of skill in the art. The other end 11 of the connector 15 can connect to another platform by any known conventional connecting method including but not limited to by tying or by engaging counterpart connection pieces wherein the mounting frame 12 has either a held or holding connector piece to be connected to the opposite connector piece on the second platform. Such held connector pieces include but are not limited to loops, handles, holes, ball and hitch, hitch pins, or the like. Holding connection pieces include but are not limited to clasps, latches, claws, talons, hooks and the like. For example, a contemplated connection method includes a robotic device's claw or pincer grabbing a handle on connector 15.

As shown in FIGS. 1 and 2, in an exemplary embodiment of the present invention, mounting frame 12 is coupled to a motorized host platform 55 for pushing or pulling mounting frame 12. Motorized host platform 55 is connected to mounting frame 12 by way of a connector 49 (see FIG. 4) attached to connector 15. Motorized host platform 55 can be any and all machines, vehicles, robots, or other such platforms known to those of skill in the art capable of pushing or pulling mounting frame 12 including but not limited to unmanned vehicles, trucks, tanks, cars, motorcycles, low-fling aircraft, and hovercraft. Preferably, though not necessarily, the motorized host platform 55 is an unmanned remotely controlled vehicle such as but not limited to the iRobot Packbot® and the Foster-Miller Talon® robot. The connector 49 of the motorized host platform 55 is coupled to the connector 15 of mounting frame 12 by way of any conventionally known connecting methods including but not limited to by tying or by engaging counterpart connection pieces wherein the connector 49 has either a held or holding connector piece such as a pincer or pincher mechanism to be connected to the opposite connector piece on connector 15. Such held connector pieces include but are not limited to loops, handles, holes, ball and hitch, hitch pins, or the like. Holding connection pieces include but are not limited to clasps, latches, claws, talons, hooks and the like. For example, a contemplated connection method includes the robotic device's claw or pincer grabbing a handle on connector 15. In a further embodiment of the invention, motorized host platform 55 is remotely controlled. A connector 15 for connecting the mounting frame 12 to a separate platform is releasably attached to a side of mounting frame 12 so that sensor 20 can be towed or pushed by a robotic device rather than held by a human operator.

Sensor 20 is mechanically swept automatically when the mounting frame 12 is moved either forward or in reverse. The mechanical motion sweeps the sensors automatically through a series of gears, pulleys, and levers. In an exemplary embodiment of the present invention, the sensor sweeper 100 uses interchangeable or reconfigurable gears and levers to modify the sweep rates per linear travel distance. Appropriate sweep rates are required to accommodate various effective footprints for sensors and to prevent unswept areas. In an alternate embodiment, the sensor sweeper 100 uses interchangeable cradles 3 and foam pads 2 to accommodate various available handheld sensors. In one exemplary embodiment, rotary encoders connected to the axle 13 and to the oscillating plate 6 provide precise locations of objects detected by the sensor 20.

Figure 3:
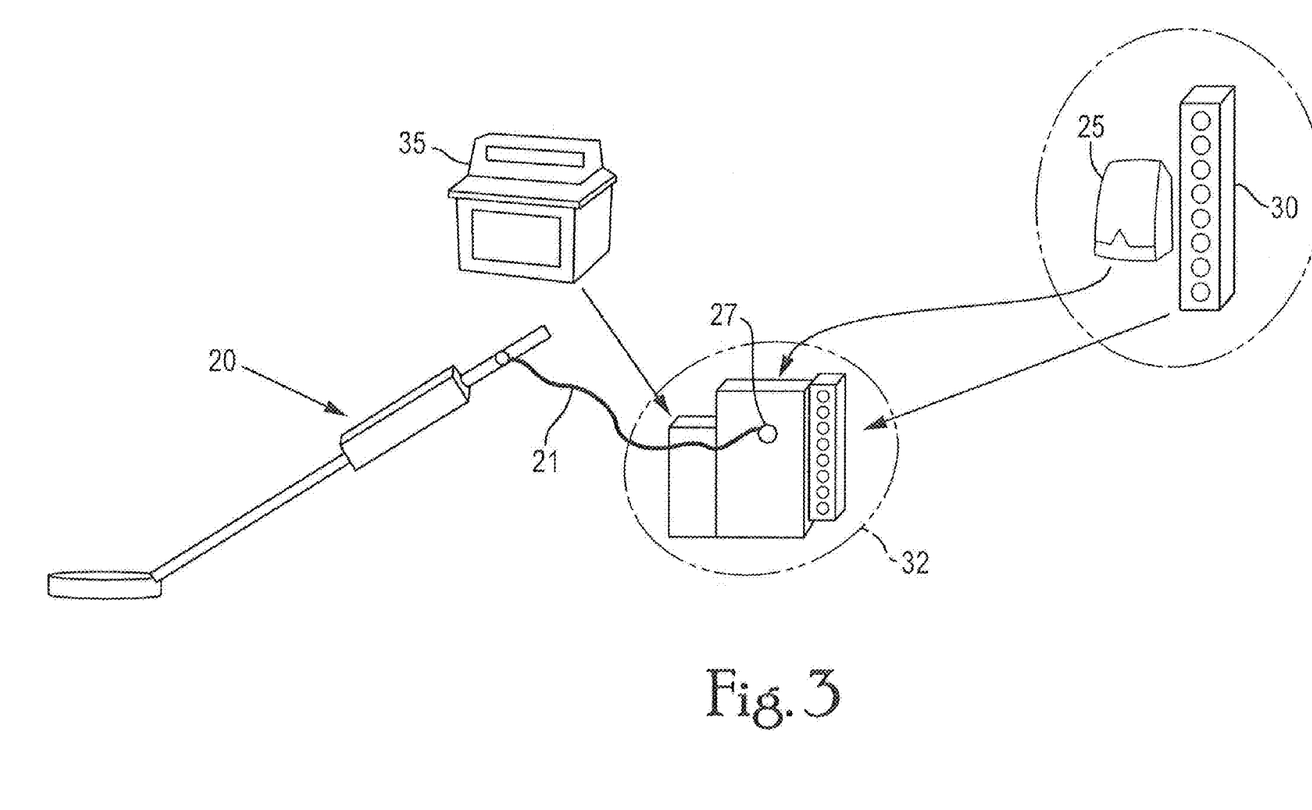
FIG. 3 is an exploded view of elements of a remote kit in accordance with an exemplary embodiment of the present invention.

Referring now to FIGS. 1 and 3, a remote kit 32 is connected to sensor 20 in order to boost, create, and/or transmit a warning signal when a mine is found. In an exemplary embodiment of the present invention, speaker 25, a light 30, and a power unit 35 coupled as a remote kit 32 capable of being connected to a sensor 20 for detecting surface or subsurface objects. The speaker 25 is electronically connected to the sensor 20 by tapping the speaker 25 into the speaker output 27 of the sensor 20. In an alternate embodiment, wires 21 deliver power to sensor 20 and signals from sensor 20 to a processor 101 located in the remote kit 32. The processor 101 can be configured to control the speaker to make a noise when the sensor detects an object and also can be configured to control the light to produce electromagnetic waves when the sensor detects an object. In yet a further embodiment, the processor 101 can transmit a digital or electronic signal directly to the operator of the object detection system indicating that an object has been located. The light 30 is electronically connected, to sensor 20 by connecting to the speaker 25. A power kit 35 is electronically connected to the sensor 20, the speaker 25, and the light 20. In an alternate embodiment, a power kit 35 can include solar cells that recharge the power unit 35 or battery therein. The remote kit 32 comprising the speaker 25, a light 30, and power kit 35 is completely self-contained and can be electronically connected to any sensor that has a speaker output. In a further embodiment of the present invention, the remote kit 32 can include a signal transmitter to transmit a signal when an object being sought is sensed, hi a further embodiment, a processor 101 can be connected to the signal transmitter and will transmit a digital or electronic signal directly to the operator of the object detection system indicating if and when an object has been located.

The speaker 25 is for producing sound when an object is detected by the sensor 20. The speaker 25 encompasses any and all known sound producing devices capable of being electronically connected to sensor 20, including but not limited to amplified speakers, horns, buzzers, or a radio transmitter, capable of being electronically connected to sensor 20. Preferably, though not exclusively, the speaker 25 will produce sound that can be heard at least 200 feet away. In an alternate embodiment, the invention can further comprise a microphone that is directly connected to the speaker 25 that will transmit the sound of the speaker 25 directly to a specified location. The speaker 25 is electronically connected to the sensor 20 by any electrical connection known to those of skill in the art including but not limited to tapping into the headphone or speaker output 27 of sensor 20. In an alternative embodiment, the speaker 25 can be wirelessly connected to the sensor 20. In yet another embodiment, a two-way radio 28 is included as part of the remote kit 32 to receive audio signals from the sensor 20 and transmit them to the operator of the object sensing system.

The light 30 emits electromagnetic waves when an object is detected by the sensor 20. The light 30 can be any and all light emitting devices capable of being electronically connected to sensor 20 including but not limited to light towers, filament bulbs, light emitting diodes, light strobes, and the like. The light 30 is electronically connected to the sensor 20 either by connection to speaker 25 or directly connecting to the sensor 20 by any electrical connection known to those of skill in the art including but not limited to tapping into the headphone or speaker output 27 of sensor 20. In the alternative, the light 30 can be wirelessly connected to the sensor 20. In a further embodiment, the light 30 will further comprise a circuit that will allow the louder or stronger sensor detections to result in brighter light emitted from the light 30. For example if light 30 were a light tower having a plurality of lights varying in brightness, the circuit in the light tower would increasingly turn on more lights and additionally increase the brightness of those lights relative to the strength of the sensor's detection of a particular object.

The power kit 35 provides the sensor 20, the speaker 25, and the light 30 with the requisite power to operate. The power kit 35 is electronically connected to the sensor 20, the speaker 25, and the light 30 by any electrical connection known to those of skill in the art. Examples of power kit 35 include but are not limited to batteries, solar panels, fuel-cells, inertial generator, and the like. The power kit 35 can be the primary, supplementary, or recharging power source for any of the sensor 20, the speaker 25, or the light 30.

In an exemplary embodiment of the present invention, remote kit 32 can be releasably mounted to the top of mounting frame 12 and or connector 15. These items can be mounted in any and all known manners for releasably mounting an object to a surface as understood by those of skill in the art, including but not limited to by quick-connect interfaces such as: velcro straps, rubber straps, spring clamps, clamps.

Figure 4:
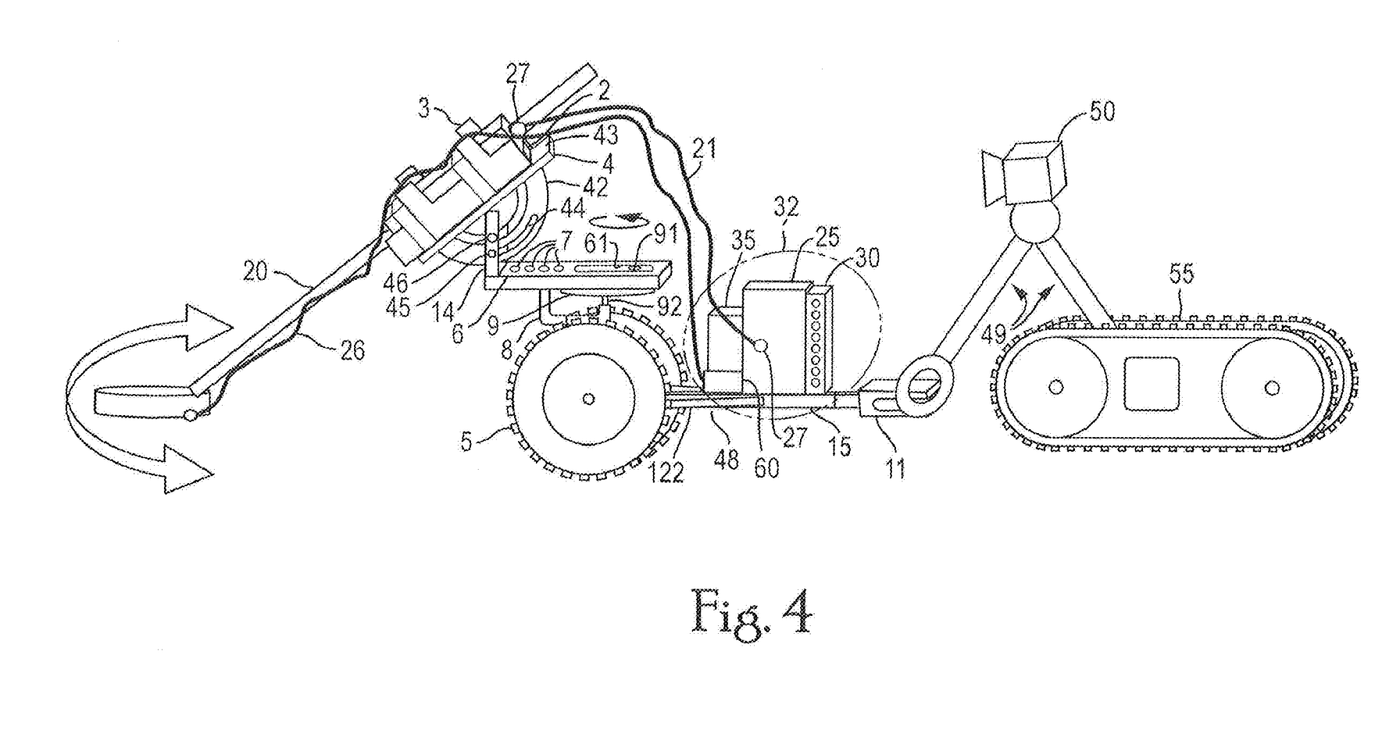
FIG. 4 is a side elevation view of a sensing device coupled to a motorized host platform having a camera disposed thereon in accordance with an exemplary embodiment of the present invention.

FIG. 4 further shows another embodiment of the invention comprising a camera 50 mounted to the motorized host platform 55 and a marking system 60. In alternate embodiments camera 50 can be mounted to either mounting frame 12 or platform 55. In one embodiment, camera 55 transmits images of light 30. In alternate embodiments camera 55 can transmit images of mounting frame 12 in its entirety or the area being explored. Camera 55 comprises any and all known cameras capable of transmitting images to a pre-specified location including but not limited to any conventional camera that takes both still and moving images including but not limited to a CCD camera, infrared camera, night vision camera, and any other such camera In a variant embodiment, the camera is capable of night-vision such as but not limited to an image intensifier or infra-red camera.

Figure 5:
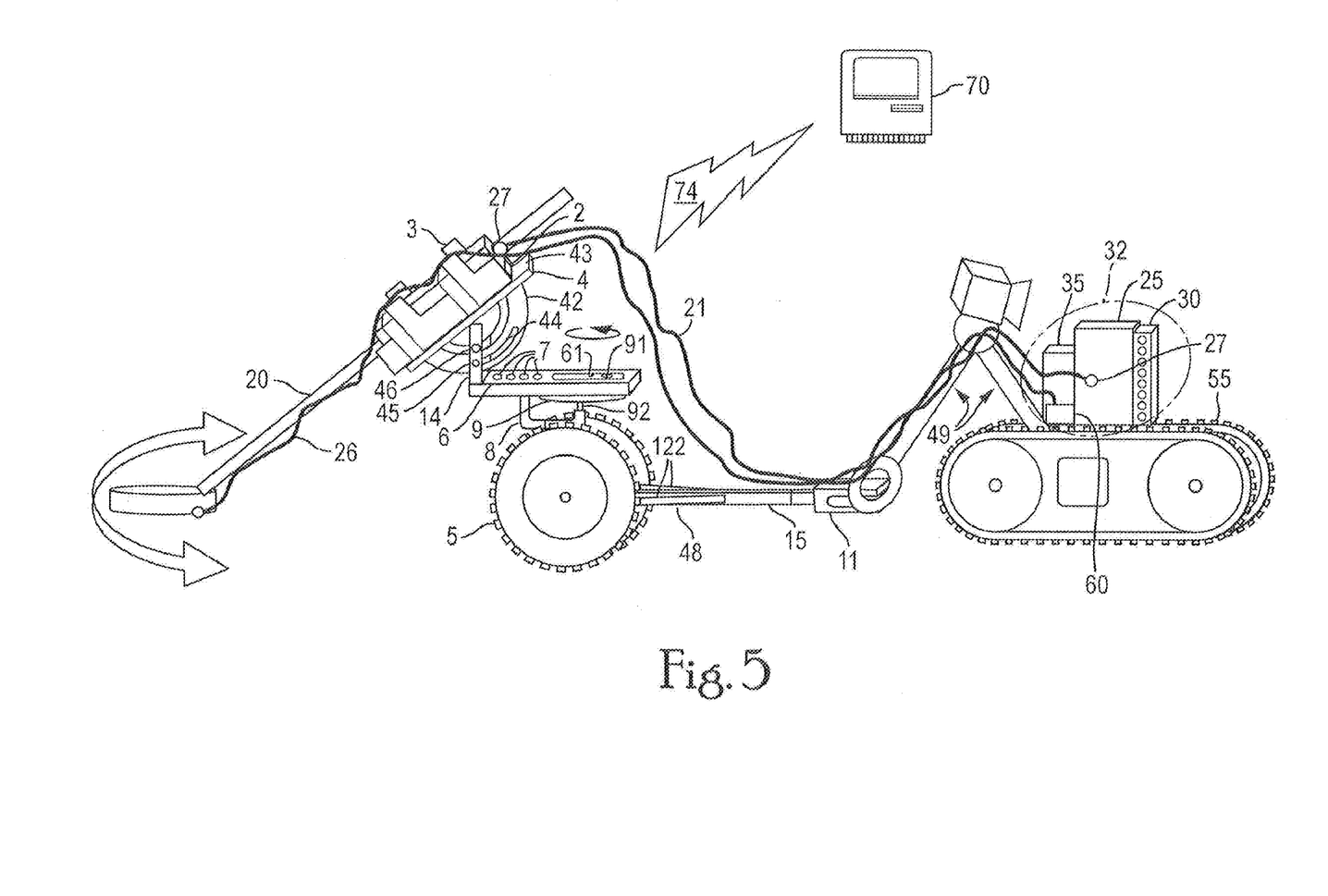
FIG. 5 is a side elevation view of a sensing device wherein the remote kit is disposed on the motorized host platform in accordance with an exemplary embodiment of the present invention.

With further reference to FIGS. 4 and 5, another embodiment of the invention comprises a marking system 60 connected to mounting frame 12. The marking system 60 is for marking a location of an object detected by sensor 20 on the surface of where the object is located and includes conventional marking systems such as paint spray, flag, token, GPS-tagging, and the like. Such a marking system 60 can mark the location of the object using conventional methods including the use of a jet, pointable jet, or marking array that uses liquid, powder, foam, or mechanical markers (poker chips). The marking system 60 is controlled by a computer 70 in wireless communication 74 with the marking system 60 and the sensor 20. The computer 70 can also be in wireless communication with speaker 25 and light 30 to control such aspects including but not limited to the volume of the speaker 25 and the brightness of the light 30. In an alternate embodiment, the computer 70 may be connected by wire to the sensor 20 and the marking system 60 and can be located in or on mounting frame 12. The computer 70 controls the marking system 60 and directs the marking system 60 to mark a location of a subsurface object should such an object be detected. The computer 70 runs software conventionally applicable to process position information provided by sensor 20 to determine when and where to mark the location of a subsurface object on the surface of a medium. Yet another embodiment of the invention further comprises a conventional method for overriding automatic computer 70 instructions by allowing a user or operator to wirelessly transmit input instructions directly into the computer 70 using conventionally known methods.

FIG. 5 shows yet another embodiment of the present invention where the power kit 35, speaker 25, and light 30 are electronically connected to sensor 20 and releasably mounted on motorized host platform 55. In alternate embodiments of the invention each of speaker 25, and light 30 can be mounted on either mounting frame 12 or motorized host platform 55. An exemplary embodiment of the invention provides a method for detecting surface or subsurface objects comprising: providing a sensor sweeper capable of swinging a sensor according to a predetermined footprint and providing a remote kit comprising a speaker, a light, and a power unit capable of being connected to a speaker output of a sensor for detecting surface or subsurface objects; providing a power unit that provides power to the sensor, the speaker, and the light; either pulling or pushing the sensor sweeper such that the sensor is swung according to a predetermined footprint; detecting an object with the sensor; emitting a sound from the speaker when the sensor detects the object; and emitting electromagnetic waves from the light when the sensor detects the object. An additional embodiment further comprises connecting the sensor sweeper to a motorized host platform, and pulling or pushing the platform with the motorized host platform over an area to be searched.

In yet another embodiment of the invention, the method further comprises providing a marking system coupled to the platform; and marking the location of an object once it is detected by the sensor. In a further embodiment, the method further comprises using a pincer on a motorized host platform to activate the marking system. For example, if the marking system is a fluid dispenser, the pincer is instructed to either squeeze or twist a handle that activates the pump mechanism. If the marking system is a "poker chip" dropping system, the pincer is instructed to twist or squeeze a handle that activates the "poker chip" mechanism. Furthermore, an additional embodiment further comprises providing an automatic break mechanism and thereby locking the wheels of the motorized host platform and or mounting frame until the pincer squeezes a release handle. It will be readily understood by those of skill in the art that the marking system can be activated in any number of ways all of which are contemplated by the present invention.

In an alternate embodiment of the present invention, a method for detecting surface or subsurface objects comprises: placing a self-contained object detector comprising a sensor sweeper and a remote kit in an area to be inspected for a predetermined object such as a mine; connecting the self-contained object detector to a remotely controlled host platform; operating the self-contained object detector by remotely controlling the host platform to push or pull the self-contained object detector; ceasing to operate the self-contained object detector; disconnecting the self-contained object detector from the host platform.

The previously described versions of the present invention have many advantages, including but not limited to a safer, more convenient, less expensive, and efficient way of detecting surface or subsurface objects including but not limited to landmines and explosives. By having a self-contained detecting system capable of being carried, pushed, or towed by a remotely controlled motorized host, the sensor can search a hazardous area while the operator remains in a safe area. Furthermore, the sensor sweeper and remote kit comprising the speaker, the light, and the power unit is adaptable to virtually any hand-held sensor and the sensor sweeper and remote kit with the mounting frame is adaptable to any motorized host platform. As such, the invention can be used by virtually anybody anywhere. Moreover the sensor sweeper and remote kit is inexpensive, easy to manufacture, and easy to deploy, thereby providing a safer, less expensive, and efficient way to detect surface or subsurface objects.

Although the present invention has been described in considerable detail with reference to certain versions thereof, other versions are possible. For example: the system as a whole can be remotely controlled; the system can further comprise multiple sensors with each sensor capable of sensing a different type of object; the system can include day and night vision cameras. Any and all such versions and others as readily understood by those of skill in the art are contemplated by the present invention.

The invention claimed is:

1. An object detection apparatus for detecting surface and subsurface objects comprising:
    a sensor for detecting objects;
    a mounting frame;
    a motorized host platform connected to said mounting frame for either pulling or pushing said mounting frame;
    a sweeping mechanism connected to said sensor and said mounting frame for mechanically sweeping said sensor in a direction transverse to a motion of the motorized host platform according to a predetermined footprint when said motorized host platform either pulls or pushes said mounting frame;
    a signaling mechanism for signaling when said sensor senses an object beneath said surface.

2. The apparatus of claim 1 wherein said motorized host platform comprises a pincher mechanism for grabbing said mounting frame; and wherein said motorized host platform is connected to said mounting frame by said pincher.

3. The apparatus of claim 1 wherein said sweeping mechanism comprises:
    a cradle for holding said sensor;
    a foam bed placed upon said cradle for holding said sensor and for dampening vibrations;
    a slant adjustment for adjusting a slant of said sensor, wherein said slant adjustment comprises a mounting plate comprising an upper and lower portion; wherein said upper portion is connected to and supports said cradle and said bottom portion further comprises a pivot and an adjusting arc comprising an arctuate slot;
    a riser yolk connected to said slant adjustment; said riser yolk comprising a set of upper holes and a set of lower holes; wherein said upper holes are connected to said pivot by a pin and wherein said lower holes are connected to said arctuate slot by an adjusting bolt;
    an oscillator plate connected to said riser yolk; said oscillator plate comprising an oscillator slot and a plurality of swing adjustment holes for defining said footprint of said sensor;
    a riser arm comprising a proximal and distal end; wherein said proximal end is connected to said oscillator plate by extending into one of said plurality of swing adjustment holes;
    an oscillator platter comprising a pin; wherein said pin extends through said oscillator slot;
    a vertical axle comprising an upper and lower end; wherein said upper end is connected to said distal end of said riser arm and upon which is fixed said oscillator platter;

a horizontal cog gear upon which is fixed said lower end of said vertical axle;

a vertical cog gear connected to said horizontal cog gear such that said vertical cog gear rotates said horizontal cog gear, thereby oscillating said oscillator platter which in turn oscillates said cradle and said sensor to sweep according to said predetermined footprint.

4. The apparatus of claim 1, further comprising a carrying case for housing said sweeping mechanism in a folded or disassembled form.

5. The apparatus of claim 1 wherein said signaling mechanism comprises:

a speaker electronically connected to said sensor;

a processor electronically connected to said sensor and said speaker, wherein said processor is configured to control said speaker to make a noise when said sensor detects an object, and and a power unit electronically connected to said sensor, said speaker, and said processor for providing power thereto.

6. The apparatus of claim 5, wherein said power unit comprises a solar panel.

7. The apparatus of claim 1 wherein said signaling mechanism comprises:

a light electronically connected to said sensor;

a processor electronically connected to said sensor and said light, wherein said processor is configured to control said light to emit electromagnetic waves when said sensor detects an object; and a power unit electronically connected to said sensor, said light, and said processor for providing power thereto.

8. The apparatus of claim 7, wherein said power unit comprises a solar panel.

9. The apparatus of claim 1 further comprising:

a marking system connected to said sweeping mechanism for marking a surface of a medium;

a processor electronically connected to said sensor and said marking system, wherein said processor is configured to control said marking system to mark a surface of a medium where an object is detected by said sensor.

10. The apparatus of claim 1 wherein said sensor comprises an adjustable caster wheel connected to a portion of said sensor for supporting said sensor and for adjusting a distance of said sensor from a surface being explored.

11. The apparatus of claim 1 wherein said sensing mechanism further comprises a processor; said processor configured to provide down-track accuracy.

12. The apparatus of claim 1 further comprising a camera mounted either on said motorized host platform or on said mounting frame for capturing images of said signaling mechanism.

13. The apparatus of claim 1 further comprising a camera mounted either on said motorized host platform or on said mounting frame for capturing images of an area being explored by said sensor.

14. The apparatus of claim 1 wherein said sensor comprises ground penetrating radar.

15. The apparatus of claim 1 wherein said object comprises a mine.

16. A method for detecting surface and subsurface objects, the method comprising:

providing a sensor for detecting an object on or beneath a surface of medium;

providing a sweeping mechanism for sweeping said sensor in a direction transverse to a motion of a host platform connected to said sensor according to a predetermined footprint;

operating said sweeping mechanism by pulling or pushing said sweeping mechanism;

providing a signaling mechanism for signaling when said sensor senses an object beneath said surface.

17. The method of claim 16 wherein said step of providing a signaling mechanism comprises providing a speaker electronically connected to said sensor and producing an audible noise from said speaker upon detection of an object by said sensor.

18. The method of claim 16 wherein said step of providing a signaling mechanism comprises providing a light electronically connected to said sensor and producing electromagnetic waves from said light upon detection of an object by said sensor.

19. The method of claim 16 further comprising:

providing a marking system coupled to said sweeping mechanism;

moving said sweeping mechanism in relation to an object; and marking a surface of a medium on or beneath which is located said object.

20. The method of claim 16 further comprising the step of:

modifying said sweep footprint by replacing or altering parts of said sweeping mechanism.

21. A method for detecting surface and subsurface objects, the method comprising:

sweeping a sensor in a direction transverse to a motion of a host platform connected to said sensor over a surface of a medium according to a predetermined footprint by pulling or pushing said sensor;

detecting an object on or beneath said surface of said medium with said sensor;

signaling when said sensor senses an object beneath said surface by either producing an audible noise or a visible electromagnetic waves.

22. The method of claim 21 further comprising the step of marking a surface of said medium on or beneath which is located an object.

23. A method for detecting surface of subsurface objects comprising:

placing a self-contained object detector in an area to be inspected for a predetermined object; wherein said self-contained object detector comprises a sweeping mechanism connected to a sensor for sweeping said sensor in a direction transverse to a motion of a host platform connected to said self-contained object detector, and a mounting frame and a signaling mechanism for signaling when said sensor senses an object beneath said surface;

operating said self-contained object detector by remotely controlling the host platform to push or pull the self-contained object detector;

ceasing to operate the self-contained object detector;

disconnecting the self-contained object detector from the host platform.

24. The method of claim 23 wherein the connecting step comprises grabbing said self-contained object detector with a pincher located on said host platform.

* * * * *